United States Patent
Sasao

(10) Patent No.: US 7,961,692 B2
(45) Date of Patent: Jun. 14, 2011

(54) COMMUNICATION TERMINAL AND METHOD OF SEARCHING

(75) Inventor: Nobuaki Sasao, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 665 days.

(21) Appl. No.: 12/103,361

(22) Filed: Apr. 15, 2008

(65) Prior Publication Data

US 2008/0253343 A1    Oct. 16, 2008

(30) Foreign Application Priority Data

Apr. 16, 2007  (JP) ................ P2007-107296

(51) Int. Cl.
*H04Q 7/24* (2006.01)
(52) U.S. Cl. .......................... 370/338; 370/331; 455/434
(58) Field of Classification Search .................. 370/338, 370/331, 329; 455/432.1, 434, 435.2, 436
See application file for complete search history.

(56) References Cited

U.S. PATENT DOCUMENTS

| | | | |
|---|---|---|---|
| 6,985,463 B1 * | 1/2006 | Wright et al. ............... | 370/331 |
| 7,146,636 B2 * | 12/2006 | Crosbie .......................... | 726/7 |
| 7,248,858 B2 * | 7/2007 | Barber et al. ............... | 455/414.1 |
| 7,263,357 B2 * | 8/2007 | Lee et al. .................... | 455/432.1 |
| 7,359,354 B2 * | 4/2008 | Julka et al. ................ | 370/331 |
| 7,457,634 B2 * | 11/2008 | Morinaga et al. ......... | 455/550.1 |
| 7,668,140 B2 * | 2/2010 | Van Bemmel ............. | 370/331 |
| 2002/0021681 A1 * | 2/2002 | Madour ..................... | 370/331 |
| 2006/0126579 A1 | 6/2006 | Kim et al. | |
| 2006/0148486 A1 | 7/2006 | Kim et al. | |
| 2009/0168699 A1 * | 7/2009 | Lo .............................. | 370/328 |
| 2010/0103844 A1 * | 4/2010 | Kim ............................. | 370/254 |
| 2010/0303040 A1 * | 12/2010 | Takamune .................. | 370/331 |

FOREIGN PATENT DOCUMENTS

| | | |
|---|---|---|
| CN | 1695349 A | 11/2005 |
| JP | 2001-224074 | 8/2001 |
| JP | 2002-252620 | 9/2002 |
| JP | 2003-91467 | 3/2003 |
| JP | 2005-12973 | 1/2005 |
| JP | 2005-286585 | 10/2005 |
| JP | 2005-286783 | 10/2005 |
| JP | 2005-286941 | 10/2005 |
| JP | 3799323 | 4/2006 |
| JP | 2006-254346 | 9/2006 |
| JP | 2007-53628 | 3/2007 |

* cited by examiner

Primary Examiner — Andrew Lee
(74) Attorney, Agent, or Firm — Oblon, Spivak, McClelland, Maier & Neustadt, L.L.P.

(57) ABSTRACT

A communication terminal capable of wireless LAN communication includes: a search unit that searches for a base station that should be an access point; a database that stores an application of the wireless LAN communication and search information utilized for searching associated with the application; a set-up unit that sets up the application; and a determination unit that determines search information in accordance with the application, by retrieving search information corresponding to the application from the storage unit. The search unit searches for a search-targeted base station that should be an access point, by targeting only a base station that corresponds to a base station identifier contained in the search information, for a predetermined period.

4 Claims, 6 Drawing Sheets

Fig.3

| ESSID | AREA RANGE | CHANNEL | APPLICATION |
|---|---|---|---|
| OFFICE 1 | FLOOR FOR WORKPLACE | AUTOMATIC | OFFICE |
| OFFICE 2 | FLOOR FOR CONFERENCE ROOM | AUTOMATIC | OFFICE |
| OFFICE 3 | FLOOR FOR DINING ROOM | AUTOMATIC | OFFICE |
| HOME | HOME | 6ch | HOME |
| ... | ... | ... | ... |

| APPLICATION | T1 VALUE | Tmax VALUE | MAXIMUM SEARCH NUMBER N | ΔT | CYCLE M FOR SEARCHING ALL ESSIDS | FIXED FLAG FOR TARGETED ESSID |
|---|---|---|---|---|---|---|
| OFFICE | 2 SECONDS | 30 MINUTES | 5 | 4 SECONDS | 2 | 0 (NO) |
| HOME | 2 SECONDS | 3 HOURS | 5 | 5 MINUTES | 3 | 1 (YES) |
| ... | ... | ... | ... | ... | ... | ... |

11E

COMMUNICATION TERMINAL AND METHOD OF SEARCHING

BACKGROUND OF THE INVENTION

1. Field of the Invention

A present invention relates to a communication terminal capable of wireless LAN communication, and a method of searching for a base station that should be an access point, performed by the communication terminal.

2. Related Background Art

In recent years, wireless LANs have become common as a means of connecting to the Internet. Such a wireless LAN is one type of LAN in which a network can be constituted without using a cable, for example, connectability with the Internet is achieved without a cable connection by wireless connection with a base station called an access point, from a communication terminal in which a wireless LAN module is installed. The base stations include, for example, an individual base station installed at a private residence, public base stations installed outdoors, and fee-based base stations provided by a service provider.

When radio wave conditions between a communication terminal and a current access point deteriorate during wireless LAN communication, the communication terminal searches for a new access point and continues the wireless LAN communication with the newly-searched access point.

However, the communication terminal cannot judge whether or not a base station that can be an access point exists in the vicinity, prior to searching for a new access point. Consequently, even in cases where, for example, no base station that can be an access point exists in the vicinity and searching is not needed, the communication terminal still performs searching for a new access point, resulting in problems of wasted processing time and wasted power consumption.

As a technique for suppressing power consumption in wireless LAN communication, for example, a technique where a communication terminal communicates with only pre-determined base stations is disclosed in the Japanese patent laid-open gazette 2005-12973. However, there is no known technique for suppressing power consumption focusing on searching for a new access point.

SUMMARY OF THE INVENTION

The present invention was made in order to solve the above problem, and its purpose is to reduce searching process time and suppress power consumption by eliminating unnecessary searching processes to search for a new access point in wireless LAN communication.

A communication terminal according to the present invention is a communication terminal capable of wireless LAN communication and includes: (1) search module for searching for a base station that should be an access point for the wireless LAN communication; (2) storage module for storing an application of wireless LAN communication and search information to be utilized for searching for the base station by the search module, associated with the application of wireless LAN communication; (3) set-up module for setting up an application of the wireless LAN communication; and (4) determination module for determining search information in accordance with the application, by retrieving search information corresponding to the application set up by the set-up module, from the storage module, and wherein the search module searches for a search-targeted base station that should be an access point, by targeting only a base station that corresponds to a base station identifier contained in the search information, for a predetermined period.

In the above communication terminal, when an application of the wireless LAN communication is set up by the set-up module, the determination module determines search information in accordance with the application, by retrieving search information corresponding to the application thus set up, from the storage module. And the search module then searches for a search-targeted base station that should be an access point, by targeting only a base station that corresponds to a base station identifier contained in the search information, for a predetermined period. In this way, searching for a new access point is performed by targeting only a base station that corresponds to the application for a predetermined period. Therefore unnecessary searching processes are eliminated, and searching process time is reduced and power consumption is suppressed. It should be noted that "searching for a new access point is performed by targeting only a base station that corresponds to the application for a predetermined period" includes a case where searching (for example, a search of all base stations) other than the searching for a new access point by targeting only a base station that corresponds to the application is performed for a period and the searching for a new access point by targeting only a base station that corresponds to the application is performed for another period. For example, it may include an embodiment where firstly the searching for a new access point by targeting only a base station that corresponds to the application is performed a plurality of times, and then, if no access point is found, the searching other than the searching for a new access point by targeting only a base station that corresponds to the application described above is performed.

Preferably, at the communication terminal according to the present invention, the search module performs searches a plurality of times until the search-targeted base station is found, and the search information includes search parameter information, which is set in accordance with the application, including a time interval in each search and the maximum number of searches in the searches other than the final search, and the search module performs searches on the basis of the search parameter information that is thus set. In addition, at the communication terminal according to the present invention, preferably the search information includes information relating to an increase of the time interval in accordance with the application, as the search parameter information; and the search module performs searches while gradually increasing the time interval in accordance with the information relating to the increase of the time interval.

As described above, since searches are performed in accordance with search parameter information that is set in accordance with the application, searches reasonably according to the application can be implemented, and searching process time can be reduced and power consumption can be suppressed while maintaining a high reconnection rate.

It should be noted that the present invention relating to a communication terminal may also be described as an invention relating to a method of searching and the same beneficial effect can be obtained.

A method of searching according to the present invention is a method of searching for a base station, in which wireless LAN communication is enabled, and which is performed by a communication terminal having storage module for storing an application of wireless LAN communication and search information to be utilized for searching for a base station that should be an access point, associated with the application of wireless LAN communication; the method includes: (1) a setting-up step of setting up an application of the wireless LAN communication; (2) a determination step of determining search information in accordance with the application, by retrieving, from the storage module, search information corresponding to the application set up in the setting-up step; and (3) a search step of performing searches for a base station that should be an access point on the basis of the search information determined in the determination step, and wherein, in the searching step, the searches for the base station are performed by targeting only a base station that corresponds to a base station identifier contained in the search information, for a predetermined period.

According to the present invention, searching for a new access point is performed by targeting only a base station that corresponds to the application for a predetermined period. Therefore unnecessary searching processes are eliminated, and searching process time is reduced and power consumption is suppressed.

BRIEF DESCRIPTION OF THE DRAWINGS

FIG. 3 is a view showing an example of an ESSID database.
FIG. 4 is a view showing an example of a search parameter database.

DESCRIPTION OF THE PREFERRED EMBODIMENTS

Figure 1:
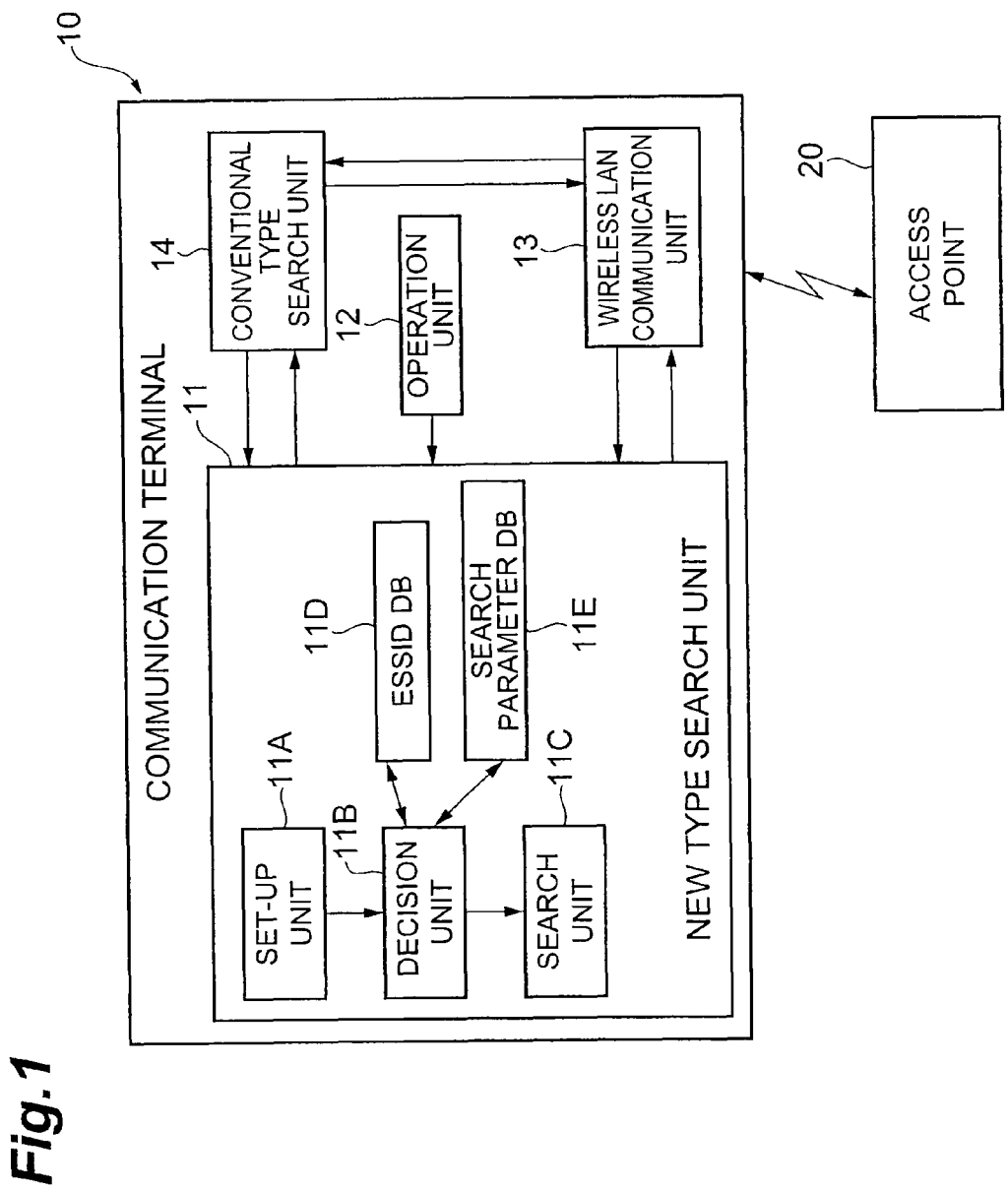
FIG. 1 is a functional block diagram of a communication terminal according to an embodiment of the invention.

An embodiment of the present invention is described below with reference to the drawings.
[Configuration of the Communication Terminal]
FIG. 1 shows a functional block layout of a communication terminal 10 according to this embodiment. As shown in FIG. 1, the communication terminal 10 is a communication terminal capable of wireless LAN communication and includes: a new type search unit 11 that performs new type searches to search for a base station that should be an access point for wireless LAN communication; a wireless LAN communication unit 13 that performs wireless LAN communication with the access point obtained by the searches; an operation unit 12 for initial settings and various types of input/selection controls, such as input of an application of the wireless LAN communication by a user; and a conventional type search unit 14 that performs conventional type searches (i.e. searches targeted all ESSIDs). The wireless LAN communication unit 13 is a unit that controls the entire wireless LAN communication functions with the exception of searching processes, and performs actions (for example, performs a measurement of the received electromagnetic wave intensity from the current access point 20, and outputs a new access search request to the new type search unit 11 when the received electromagnetic wave intensity is less than a predetermined reference value.

Figure 5:
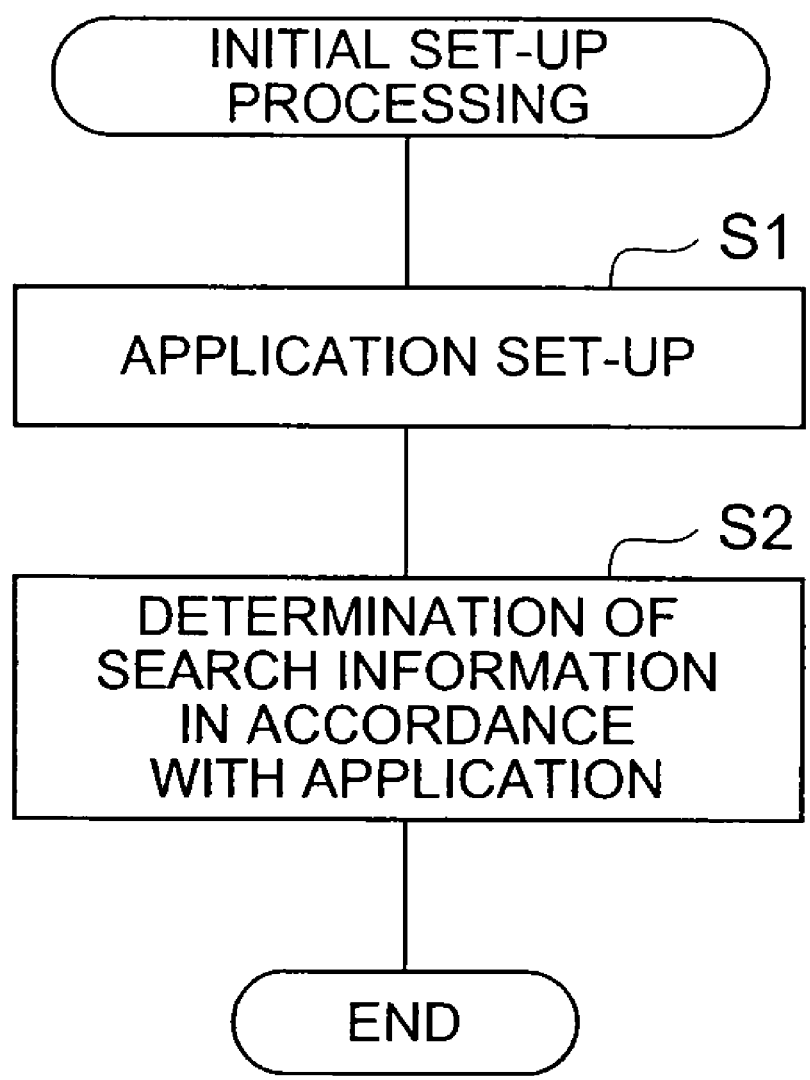
FIG. 5 is a flow chart of initial setting processing performed at the communication terminal.

The new type search unit 11 includes: an ESSID database 11D that stores the IDs of base stations to be searched (in this embodiment, ESSIDs (extended service set identifiers)); a search parameter database 11E that stores search parameters such as waiting time and maximum number of searches in searching processes; a set-up unit 11A that sets up an application by getting application information for wireless LAN communication that was input by the initial set-up processing of FIG. 5 described later, from the operation unit 12, or by automatically identifying an application from the ESSID of a re-established access point; a decision unit 11B that determines the search information in accordance with the application by retrieving the ESSID corresponding to the application from the ESSID database 11D and by retrieving the search parameters corresponding to the application from the search parameter database 11E; and a search unit 11C that searches for a base station that should be an access point by targeting the determined ESSID based on the search parameters. A characteristic feature of the search unit 11C is that the search unit 11C performs the searches by targeting only a base station that corresponds to the ESSID.

As shown in FIG. 3, for example, the ESSID database 11D stores ESSIDs and information (area range, channel etc) about each ESSID, in association with applications of the wireless LAN communication. Also, as shown in FIG. 4, for example, the search parameter database 11E stores various types of search parameters in association with applications of the wireless LAN communication. In this case, as the search parameters, there are stored: a time period T1 in the primary search (hereinbelow referred to as the "T1 value"); a maximum number of searches N in the primary search; an increment $\Delta T$ in the T1 value; a time interval Tmax in the secondary search performed when no base station is obtained by the primary search (hereinbelow referred to as the "Tmax value"); a cycle M indicating the number of secondary searches (i.e. a cycle for searching all the ESSIDs) indicating the number of times a search of all ESSIDs is performed once, in each of a plurality of secondary searches; and a fixed flag indicating fixing of an ESSID of searching target. The Tmax value is set to be longer than the T1 value.

Figure 2:
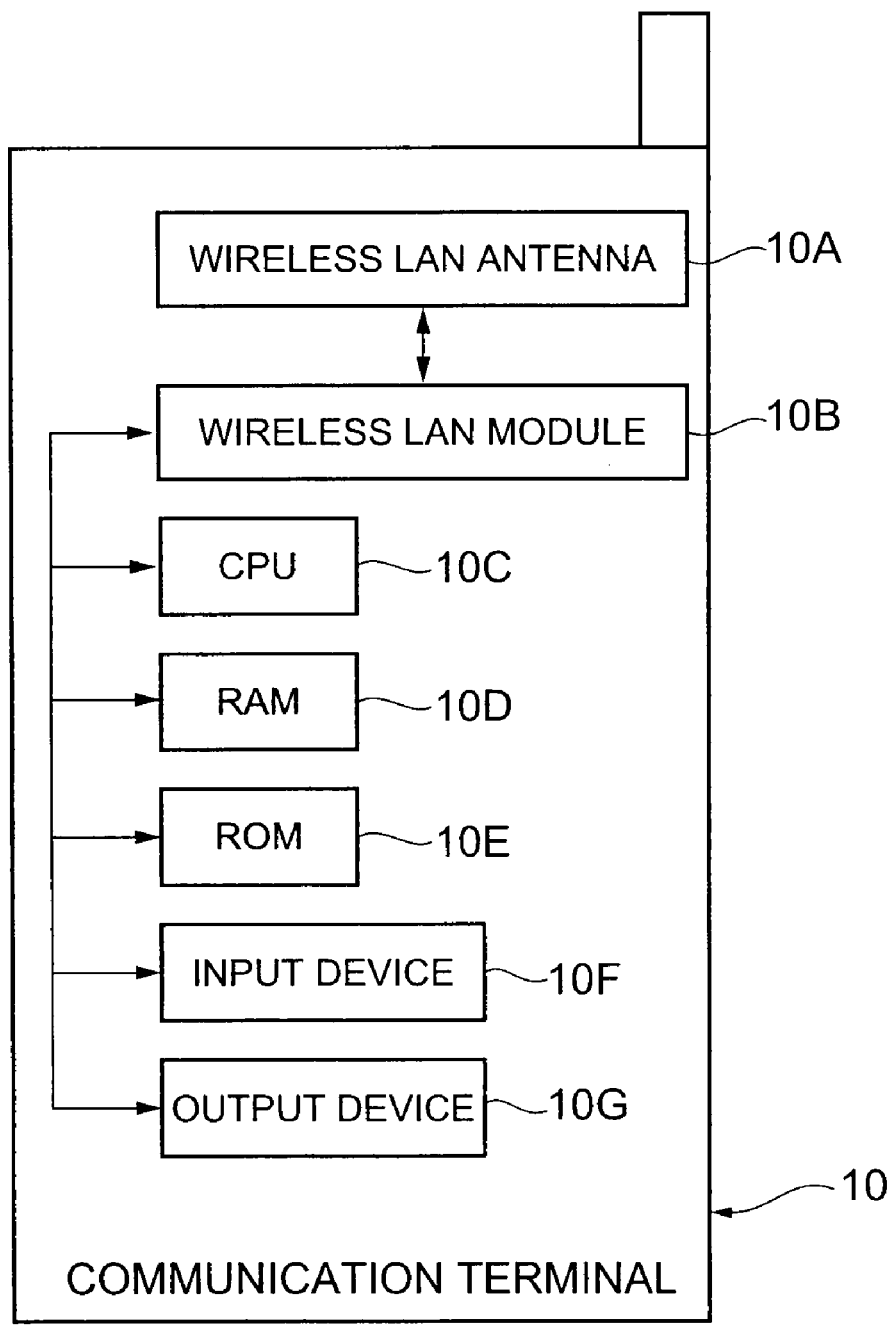
FIG. 2 is a hardware layout diagram of a communication terminal.

Incidentally, as shown in FIG. 2, a hardware layout of the communication terminal 10 is the same as that of an ordinary communication terminal capable of wireless LAN communication and no special hardware layout is necessary. Specifically, the communication terminal 10 includes a wireless LAN module 10B, a CPU 10C, RAM 10D, ROM 10E, an input device 10F and an output device 10G, which are mutually connected, and in addition, the communication terminal 10 includes a wireless LAN antenna 10A that is connected with the wireless LAN module 10B.

[Base Station Searching Process Performed by the Communication Terminal]
First of all, the initial set-up processing will be described using FIG. 5. When the set-up unit 11A of the communication terminal 10 sets up an application, via the operation unit 12, by getting wireless LAN communication application information that is input by a user from the operation unit 12 (step S1 in FIG. 5), the decision unit 11B retrieves an ESSID corresponding to the application from the ESSID database 11D and retrieves search parameters corresponding to the application from the search parameter database 11E, to determine the search parameters and the ESSID corresponding to the application (step S2). In this way, the T1 value, the maximum number of searches N, the increment $\Delta T$ of the T1 value, the Tmax value, the cycle M and the fixed flag are determined, as the search parameters.

Figure 6:
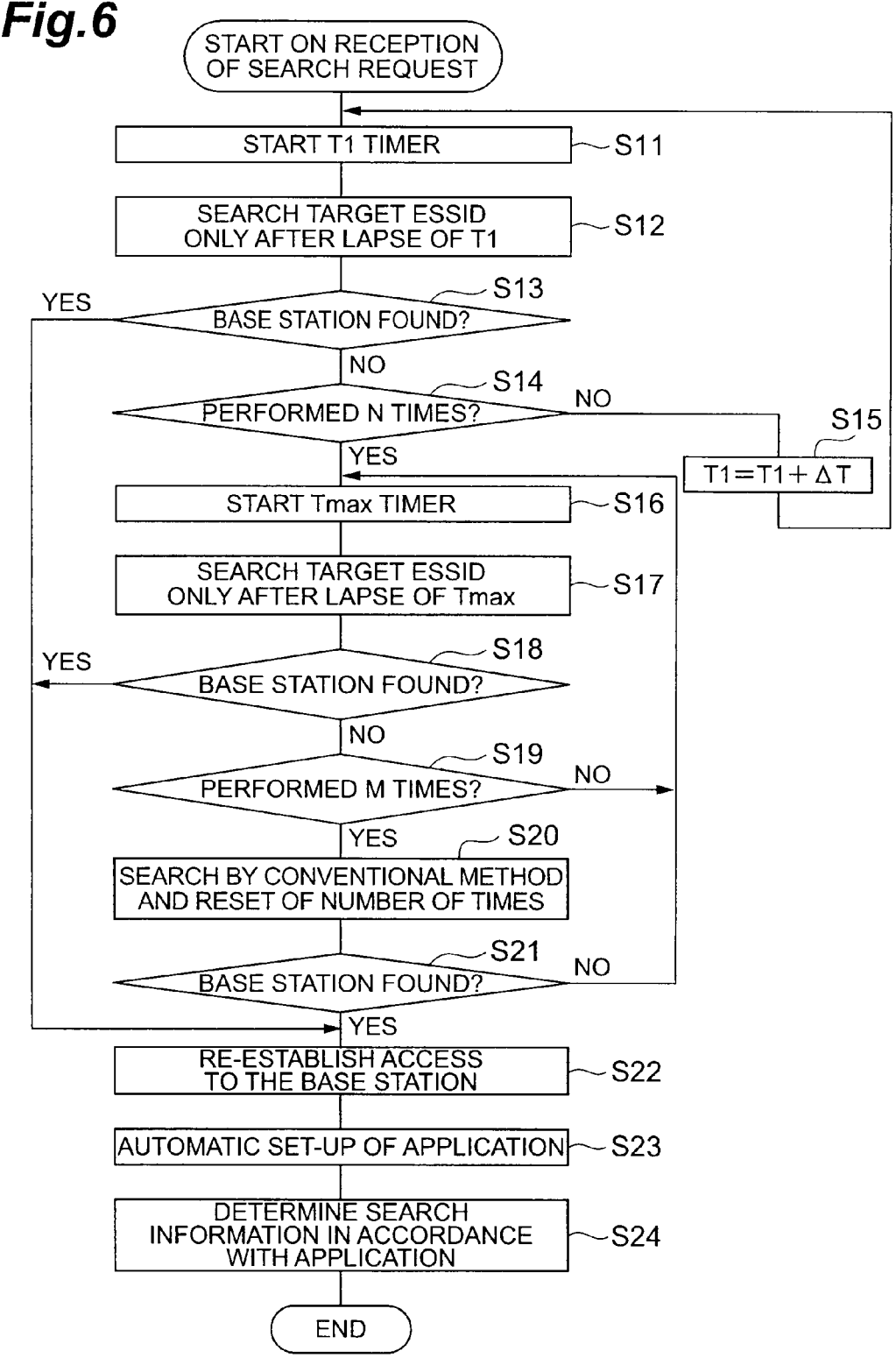
FIG. 6 is a flow chart of search processing performed at the communication terminal.

Next, a base station searching process will be described using FIG. 6. The wireless LAN communication unit 13 of the communication terminal 10 measures the received electromagnetic wave intensity from the current access point and, when the measured received electromagnetic wave intensity is less than the predetermined reference value, the wireless LAN communication unit 13 outputs a new access point search request to the new type search unit 11. When a new access point search request is received by the new type search unit 11, the base station searching process of FIG. 6 starts. The search for a new access point is performed by targeting the ESSID determined by the initial set-up processing, based on the search parameters determined by the initial set-up processing.

At first, the search unit 11C commences set-up of the T1 timer whose time limit is the T1 value (step S11). After a time-out of the T1 timer (after lapse of T1), the search unit 11C performs searches by targeting only the determined ESSID (step S12). If a base station is found in this search (positive result in step S13), the communication terminal 10 re-establishes an access to the base station (step S22).

On the other hand, if no base station is found in step S13, the processes of steps S11 to S13 is then repeatedly performed until a base station is found, to an upper limit of a maximum number of searches N. In this process, every time the processes of steps S11 to S13 finishes, the T1 value in step S15 is increased by the increment ΔT. If the increment ΔT is "0", the same value is employed as the T1 value every time.

Then, if no base station is found even though the processes of steps S11 to S13 has been repeated by the maximum number of searches N, the search unit 11C commences set-up of the Tmax timer whose time limit is the value Tmax (step S16). After a time-out of the Tmax timer (after lapse of Tmax), the search unit 11C performs searches by targeting only the determined ESSID (step S17). Afterwards, steps S16 and S17 are repeated a maximum number of M times. If a base station is then found (positive result in step S18), the communication terminal 10 re-establishes an access to the base station (step S22).

On the other hand, if no base station is found even though the steps S16 and S17 have been repeated M times (positive result in step S19), the search unit 11C reports this result to the conventional type search unit 14, and then the conventional search unit 14 performs a single search based on the conventional method (i.e. searching all the ESSIDs) (step S20). At this point, the number of times of execution of steps S16 and S17 is reset to zero. In step S20, if a base station is found (positive result in step S21), the communication terminal 10 re-establishes an access to the base station (step S22). On the other hand, if no base station is found (negative result in step S21), the conventional type search unit 14 reports this result to the search unit 11C, and the search unit 11C performs the processes of steps S16 and S17 again. In this way, in steps S16 to S21, a search based on the conventional method is performed once in step S20, for the M times of execution of the processes of steps S16 and S17.

In step S22, after the communication terminal 10 re-establishes an access to the base station, the set-up unit 11A identifies an application according to the ESSID of the base station by referring to the ESSID database 11D, and thereby automatically sets up the application (step S23). And the decision unit 11B determines the ESSID and the search parameters corresponding to the application by retrieving the search parameters corresponding to the application that has been set up, from the search parameter database 11E (step S24).

An outline will now be given of the specific processes about the processes of FIG. 5 and FIG. 6 described above, in a case where the application is "home" and in a case where the application is "office".

First of all, if the application is "home", as shown in FIG. 3, the ESSID corresponding to the application "home" can only be a "home" ESSID; as shown in FIG. 4, the fixed flag of the ESSID that is searched for is therefore "1", indicating a "home" application (meaning that the ESSID is fixed (YES)), so a search for a new access point is performed by targeting only a "home" ESSID. In this case, there is only one ESSID, i.e. it is not necessary to search for other ESSIDs. Therefore a search is performed by targeting the only one "home" ESSID fixedly. In this way, unnecessary searching processes can be reduced. In the primary search of steps S11 to S15, the T1 value is specified as two seconds and, thereafter, a new access point is searched for with the maximum number of searches specified as N (five times), the T1 value being increased by an increment ΔT (five minutes) on each occasion. In the secondary search of steps S16 to S21, a new access point is searched for with a Tmax value of three hours, and a search is performed based on the conventional method at a pace of one time in every three times of execution of the processes of steps S16 and S17 using the Tmax value. In the "home" cases, cases where the communication terminal 10 locates out of the wireless LAN communication zone may be assumed to include, for example, cases where a user enters a bathroom and the communication terminal 10 locates out of the wireless LAN communication zone for only a short time and cases where a user goes out of home and the communication terminal 10 locates out of the wireless LAN communication zone.

In contrast, in the case where the application is "office", as shown in FIG. 3, the ESSIDs corresponding to the application "office" are three in number, namely, "office 1", "office 2", and "office 3"; as shown in FIG. 4, the fixed flag of the ESSID that is searched for corresponding to the application "office" is "0" (meaning that the ESSID is not fixed (NO)). And a search is performed by targeting the ESSIDs restricted to three, namely, "office 1", "office 2", and "office 3" (not restricted to a single ESSID). Thus a search is performed by targeting the ESSIDs that are capable of connection within the office. In the primary search of steps S11 to S15, the initial T1 value is specified as two seconds and, thereafter, a new access point is searched for with the maximum number of searches specified as N (five times), the T1 value being increased by an increment ΔT (four seconds) on each occasion. In the secondary search of steps S16 to S21, a new access point is searched for with a Tmax value of 30 minutes, and a search is performed based on the conventional method at a pace of one time in every two times of execution of the processes of steps S16 and S17 using the Tmax value. In the "office" cases, cases where the communication terminal 10 locates out of the wireless LAN communication zone may be assumed to include, for example, cases where a user on a floor for workplace moves to a floor for conference room to attend a meeting and cases where a user moves to a floor for dining room to have lunch.

Benefits of the present embodiment described above are to reduce searching process time and to suppress power consumption by eliminating unnecessary searching processes, since a search for a new access point is performed by targeting only a base station in accordance with the application, for a predetermined period. Also, the searching process time can be reduced and power consumption can be suppressed while maintaining a high probability of reconnection, since the searching process is performed reasonably based on suitable search parameters in accordance with the application. Also, in the secondary search, lowering of the reconnection probability can be suppressed by performing a search based on the conventional method at a pace of once in every M times of the processes of steps S16 and S17.

It should be noted that, although, in the embodiment described above, a searching process was described including a primary search and a final search (secondary search), a searching process could include a total of three or more searches. For example, in the application "home", a searching process could include a total of three searches, i.e. (1) the primary search, (2) an additional secondary search like the primary search, and (3) a final search. In this case, the search parameters employed are, for example, time interval T1 value in the primary search is two seconds; maximum number of searches N1 is two; time interval T2 value in the secondary search is 30 minutes; maximum number of searches N2 is two; time interval Tmax value in the final search is three hours; and cycle M is three. The time interval increment in all cases is 0.

In this way, more reasonable searching process can be performed based on finer search parameters, by performing searching process that includes a total of three searches, with the search parameters constituted by the time intervals being set as a T1 value of the order of seconds (two seconds), a T2 value of the order of minutes (30 minutes), and a Tmax value of the order of hours (three hours).

The disclosure of Japanese Patent Application No. 2007-107296 filed Apr. 16, 2007 including specification, drawings and claims is incorporated herein by reference in its entirety.

What is claimed is:

1. A communication terminal capable of wireless LAN communication, comprising:
   search module for searching for a base station that should be an access point for the wireless LAN communication;
   storage module for storing
      an application of wireless LAN communication and
      search information to be utilized for searching for the base station by the search module, associated with the application of wireless LAN communication;
   set-up module for setting up an application of the wireless LAN communication; and
   determination module for determining search information in accordance with the application, by retrieving search information corresponding to the application set up by the set-up module, from the storage module, and
   wherein the search module searches for a search-targeted base station that should be an access point, by targeting only a base station that corresponds to a base station identifier contained in the search information, for a predetermined period.

2. The communication terminal according to claim 1,
   wherein the search module performs searches a plurality of times until the search-targeted base station is found;
   the search information includes search parameter information, which is set in accordance with the application, including a time interval in each search and the maximum number of searches in the searches other than the final search; and
   the search module performs searches on the basis of the search parameter information that is thus set.

3. The communication terminal according to claim 2,
   wherein the search information includes information relating to an increase of the time interval in accordance with the application, as the search parameter information; and
   the search module performs searches while gradually increasing the time interval in accordance with the information relating to the increase of the time interval.

4. A method of searching for a base station, in which wireless LAN communication is enabled, and which is performed by a communication terminal having storage module for storing
   an application of wireless LAN communication and
   search information to be utilized for searching for a base station that should be an access point, associated with the application of wireless LAN communication;
   the method comprising:
   a setting-up step of setting up an application of the wireless LAN communication;
   a determination step of determining search information in accordance with the application, by retrieving, from the storage module, search information corresponding to the application set up in the setting-up step; and
   a search step of performing searches for a base station that should be an access point on the basis of the search information determined in the determination step, and
   wherein, in the searching step, the searches for the base station are performed by targeting only a base station that corresponds to a base station identifier contained in the search information, for a predetermined period.

* * * * *